US007762522B2

(12) United States Patent
Kronberger

(10) Patent No.: US 7,762,522 B2
(45) Date of Patent: *Jul. 27, 2010

(54) APPARATUS FOR THE TRANSMISSION OF A DEFLECTION OF AN ACTUATOR

(75) Inventor: Maximilian Kronberger, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/171,960

(22) Filed: Jul. 11, 2008

(65) Prior Publication Data

US 2008/0302337 A1 Dec. 11, 2008

Related U.S. Application Data

(63) Continuation of application No. 11/195,110, filed on Aug. 2, 2005, now Pat. No. 7,404,539, which is a continuation of application No. PCT/EP2004/000975, filed on Feb. 3, 2004.

(30) Foreign Application Priority Data

Feb. 3, 2003 (DE) ................................ 103 04 240

(51) Int. Cl.
*F16K 31/02* (2006.01)

(52) U.S. Cl. .................. 251/129.06; 251/232; 251/236; 251/242; 74/519

(58) Field of Classification Search ................... 251/58, 251/129.01, 129.06, 231, 232, 238, 242, 251/243; 74/519; 310/328, 331
See application file for complete search history.

(56) References Cited

U.S. PATENT DOCUMENTS

| | | | | |
|---|---|---|---|---|
| 3,945,261 | A | 3/1976 | Wright | 74/110 |
| 4,550,744 | A | 11/1985 | Igashira et al. | 137/80 |
| 6,595,436 | B2 | 7/2003 | Kirzhner et al. | 239/102.2 |
| 6,705,587 | B1 | 3/2004 | Frank et al. | 251/129.06 |
| 6,776,390 | B1 | 8/2004 | Boecking | 251/129.06 |
| 6,787,973 | B2 | 9/2004 | Frank et al. | 310/38 |
| 2002/0134855 | A1 | 9/2002 | Lorraine et al. | 239/102.2 |

FOREIGN PATENT DOCUMENTS

| | | | |
|---|---|---|---|
| DE | 196 40 108 | C1 | 9/1996 |
| DE | 197 10 601 | A1 | 3/1997 |
| DE | 199 39 523 | A1 | 8/1999 |
| DE | 199 47 772 | A1 | 10/1999 |
| DE | 100 29 067 | A1 | 6/2000 |
| DE | 101 01 799 | A1 | 1/2001 |
| JP | 02163580 | A | 12/1988 |
| WO | WO 98/59169 | | 12/1998 |
| WO | WO 99/17014 | | 4/1999 |

OTHER PUBLICATIONS

International Search Report; PCT/EP2004/000975; 4 pp., May 26, 2004.

*Primary Examiner*—John K Fristoe, Jr.
(74) *Attorney, Agent, or Firm*—King & Spalding, L.L.P.

(57) ABSTRACT

An apparatus for the transmission of a deflection of an actuator, in particular of a piezoelectric actuator of an injection valve, comprises at least one first lever device which has a first transmission element which transmits the deflection of the actuator. In this case, there is provision for at least one first spring element to be provided for guiding or mounting the first transmission element.

18 Claims, 3 Drawing Sheets

APPARATUS FOR THE TRANSMISSION OF A DEFLECTION OF AN ACTUATOR

CROSS-REFERENCE TO RELATED APPLICATION

This application is a continuation of U.S. patent application Ser. No. 11/195,110 filed Aug. 2, 2005; now U.S. Pat. No. 7,404,539 which is a continuation of International Application No. PCT/EP04/00975 filed Feb. 3, 2004, which designates the United States and claims priority to German Application No. DE 103 04 240.7 filed Feb. 3, 2003, the contents of which are hereby incorporated by reference in their entirety.

TECHNICAL FIELD

The invention relates to an apparatus for the transmission of a deflection of an actuator, in particular of a piezoelectric actuator of an injection valve, with at least one first lever device which has a first transmission element which transmits the deflection of the actuator.

BACKGROUND

Actuators based on the piezoelectric principle are suitable for the highly accurate and very rapid control of actuating operations, such as are expedient, for example, for the activation of injection apparatuses or injection valves of internal combustion engines. In order to implement pronounced linear deflections of the piezoelectric actuators, these must consist of a multiplicity of individual piezoelectric elements stacked one on top of the other. The disadvantage of this is that the overall size assumes inadmissible dimensions for many applications. Thus, for example, the installation space for injection valves in the cylinder head of an internal combustion engine is limited in such a way that there is, as a rule, no room for piezoelectric actuators in the length dimension necessary for the desired actuating movements. For this reason, smaller piezoelectric actuators are used, the linear deflections of which are stepped up into larger deflections by suitable lever devices.

WO 99/17014 discloses, for example, an injection valve in which, for transmitting a deflection of a piezoelectric actuator to an actuating member and for stepping up this deflection, mechanical transmission elements are provided, which are essentially in the form of a cylinder, the boundary surfaces of which are of essentially triangular design, the corners being rounded. Sheetlike bearing regions are in this case formed as a result of the width of the transmission elements.

For example in conjunction with control valves for injection apparatuses, it is necessary for the actuator space to be sealed off with respect to other regions of the control valve. O-rings have already been used for this purpose. The use of O-rings presents problems, however, in as much as O-rings can be damaged relatively easily. This problem is aggregated further in that damage to an O-ring cannot readily be detected reliably during subsequent tests.

Compared with O-ring sealing off, a metallic sealing off of the actuator space therefore affords advantages, and, in preferred embodiments, there may be provision for the sealing surfaces to run perpendicularly with respect to the actuator axis. The surface pressure required for the sealing function may be applied, for example, via a connecting thread. In embodiments of this type with a metallic sealing off of the actuator space, however, there is the problem that the guide of the transmission element is not fastened nonpositively with respect to the actuator, but can move spatially within the play tolerance. This moveability may cause kinematic variations and therefore dispersions in the stroke step-up.

SUMMARY

The object on which the invention is based is to develop the generic apparatuses for the transmission of a deflection of an actuator, in such a way that an insensitive construction is achieved and undesirable dispersions of the stroke step-up are avoided or at least reduced.

This object is achieved by an apparatus for the transmission of a deflection of an actuator, in particular of a piezoelectric actuator of an injection valve, comprising at least one first lever device which comprises a first transmission element which transmits the deflection of the actuator, and a spring element for guiding the first transmission element, wherein the first transmission element is supported on a plate, the spring element is tension-mounted between a first housing portion and the plate, and the spring element prestresses the plate against a second housing portion.

The plate may constitute a stop for an actuating member to be actuated by the piezoelectric actuator. The plate can be designed as a guide plate, wherein the guide plate orients in position a second lever device with a second transmission element, wherein the second transmission element lies with a bearing region on the second housing portion and with a further bearing region on the actuating member, and wherein the second transmission element is operatively connected to the first transmission element for the actuation of the actuating member. The spring element can be of essentially circular design and may have a guide orifice in which the first transmission element is introduced and positioned. The spring element may have a circular edge region which bears against the first housing portion, and the edge region may have recesses. The spring element may have a downwardly curved edge region which runs around and which lies on the guide plate. The plate can be designed as a guide plate in the form of a circular disk, and the guide plate may have a recess in which the second transmission element is arranged. A second spring element can be provided for guiding or mounting the first transmission element. The spring element and/or the second spring element may have a flat spring characteristic curve in relation to the force generated in each case. The actuator can be assigned a first housing portion and the first lever device and/or the second lever device are/is assigned a second housing portion, the first housing portion and the second housing portion may be sealed off via at least one sealing surface running approximately perpendicularly with respect to the deflection direction of the actuator.

The apparatus according to the invention for the transmission of a deflection of an actuator builds on the generic prior art in that at least one spring element is provided for guiding or mounting the first transmission element. By means of the spring element, the first transmission element is brought into a defined position with respect to the actuator, preferably with little or no play tolerance, so that dispersions of the stroke step-up can be avoided or at least reduced. Moreover, by means of the spring element, a plate on which the first transmission element lies is prestressed relative to the housing. In a preferred embodiment, the plate constitutes a stop for the actuating member. In a further preferred version, the plate is designed as a guide plate and the guide plate guides a second transmission element which is arranged between the first transmission element and the actuating member.

In particularly preferred embodiments of the apparatus according to the invention for the transmission of a deflection of an actuator, there is provision for a second spring element to be provided for guiding or mounting the first transmission element.

In the case of a suitable design of the first and of the second spring element, this solution allows an automatic adjustment of the first transmission element and therefore an automatic setting of the stroke step-up.

In preferred embodiments of the apparatus according to the invention, there is provision, furthermore, for the first spring element and/or the second spring element to be prestressed, in the mounted state of the apparatus, in order to generate the first force and/or the second force. This solution comes under consideration particularly when the actuator and further components of the apparatus are assigned different housing portions which are connected to one another during the mounting of the apparatus, for example by means of the tightening of a fastening nut, and the first spring element and/or the second spring element are/is arranged in the region between the different housing portions.

Particularly in the connection explained above, there is advantageously provision, furthermore, for the first spring element and/or the second spring element to be prestressed by means of a third force and/or a fourth force which comprise or comprises a force component running approximately parallel to the deflection direction of the actuator. Such a prestressing of the first spring element and/or of the second spring element may be achieved, for example, if, in the unbraced state, the spring elements project beyond the interfaces of a housing portion, and the housing portion is brought into contact with an adjacent housing portion, for example as a result of the tightening of a fastening nut, so that, after the fastening nut has been tightened, the spring elements lie with an end portion in the connecting plane of the housing portions.

Particularly when the housing portions are to be connected, while at the same time being sealed off, it is preferred, furthermore, that the first spring element and/or the second spring element or the third spring element have or has a flat spring characteristic curve in relation to the force generated in each case. In this instance, the sealing force, due to the prestressing forces, is reduced, and therefore the latter must fulfill high accuracy requirements. In a particularly preferred embodiment, the spring elements are designed in such a way that the forces exerted on the first transmission element by these are exactly zero, and, if appropriate, there may be a slight play between at least one spring element and the first transmission element.

In particularly preferred embodiments of the apparatus according to the invention for the transmission of a deflection of an actuator, there is provision, furthermore, for it to have a second lever device which comprises a second transmission element, the deflection of the first transmission element being transmitted to the second transmission element. In this instance, there are two lever devices which are arranged in series and by means of which the stroke step-up ratio can be increased even further.

In this instance, it is preferred that the first transmission element is arranged between the actuator and the second transmission element with respect to the deflection direction of the actuator, and that the second transmission element is guided by at least one guide plate.

In this instance, in a preferred development of the invention, the third spring element or the first spring element and/or the second spring element are or is designed in such a way that a fifth force generated by them and exerted on the at least one guide plate is determined by the spring characteristic of the first spring element and/or of the second spring element or of the third spring element.

In all the embodiments of the apparatus according to the invention, there may be provision for the first spring element and/or the second spring element to be essentially L-shaped, at least in the prestressed state, a V-shaped portion being provided in the long leg of the L. The L-shape or V-shape may, if appropriate, also refer to the cross section through a spring element, for example when only one annular spring element is used.

Embodiments of the apparatus according to the invention are considered to be particularly advantageous in which there is provision for the actuator to be assigned a first housing portion and for the first lever device and/or the second lever device to be assigned a second housing portion, the first housing portion and the second housing portion being sealed off via at least one sealing surface running approximately perpendicularly with respect to the deflection direction of the actuator. In this case, in particular, there may be provision for the spring element or the first spring element and/or the second spring element to project beyond the sealing surface in the unbraced state and to be prestressed as a result of the tightening of a fastening nut according to the spring characteristic curve and the projection.

The invention makes it possible to dispense with additional components, such as, for example, a cup spring, and, even in series production, to ensure a prestressing force having a narrow tolerance.

BRIEF DESCRIPTION OF THE DRAWINGS

The invention, then, is explained by way of example by means of a preferred embodiment, with reference to the accompanying drawings in which.

DETAILED DESCRIPTION

Figure 1:
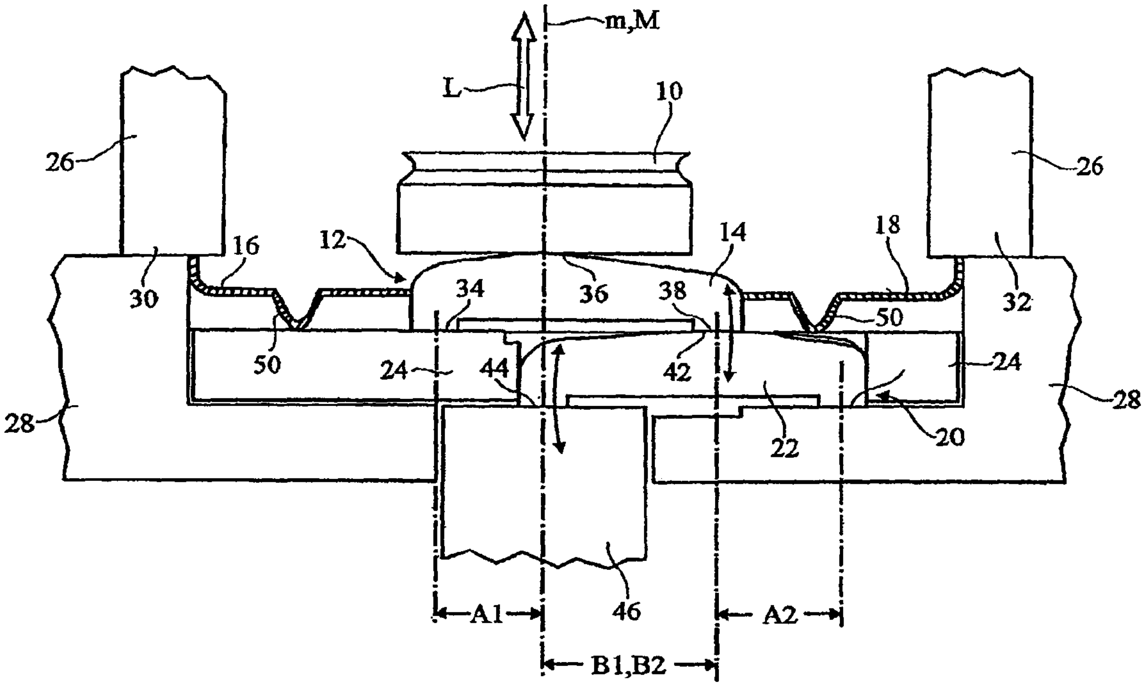
FIG. 1 shows a diagrammatic illustration of an embodiment of the apparatus according to the invention.
Figure 3C:
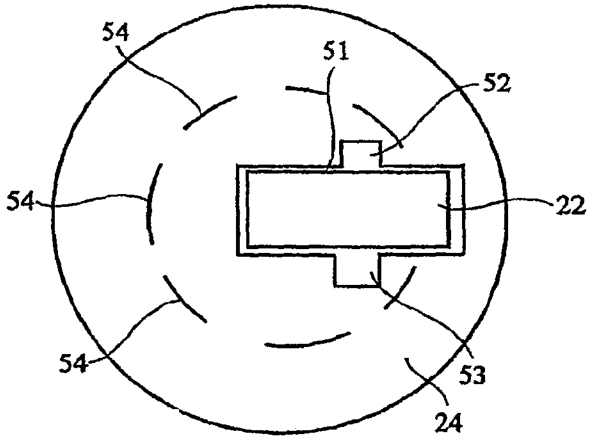
FIG. 3C shows a top view of the guide plate and the second transmission element.

FIG. 1 shows a diagrammatic basic illustration of an embodiment of the apparatus according to the invention in which two lever devices 12, 20 connected in series are provided. The first lever device has a first essentially plate-shaped transmission element 14 which is arranged perpendicularly with respect to the deflection direction L of an actuator 10 (of which only a plate is illustrated). The first transmission element 14 has a first bearing region 34 which lies on a surface of a guide plate 24 which is inserted in a circular recess of a second housing portion 28. Furthermore, the first transmission element 14 has a second bearing region 36 which is assigned to the actuator 10. A third bearing region 38 of the first transmission element 14 is assigned to a second transmission element 22 which is explained later. The first transmission element 14 has a (slightly) convex surface, the shape of which can be defined, for example, by grinding. The second bearing region 36 is in this case formed by the highest region. The underside of the first transmission element 14 has a recess which allows a relative movement between the first transmission element 14 and the guide plate 24. The position in the image plane perpendicular to the deflection direction L of the actuator 10 is defined by a first spring element 16 and a second spring element 18 which are illustrated in the prestressed state. Between a first housing portion 26 and the second housing portion 28 are provided sealing surfaces 30, 32 which seal off the actuator space with respect to other regions of the apparatus. The first housing portion 26 and the second housing portion 28 can be brought to bear, for example, by means of the tightening of a fastening nut, for example in the form of a union nut. Before the first housing portion 26 and the second housing portion 28 come to bear against one another at the sealing surfaces 30, 32, the first spring element 16 and the second spring element 18 project beyond the sealing surfaces 30 and 32 respectively. The first spring element 16 and the second spring element 18 are thus prestressed when the first housing portion 26 and the second housing portion 28 are moved toward one another. By means of the first and the second spring element 16, 18, the guide plate 24 is prestressed against a surface of the housing portion 28. Since the prestressing forces reduce the sealing forces, the prestressing forces must fulfill high accuracy requirements. The spring elements 16, 18 are therefore formed in such a way that they have a flat spring characteristic curve in relation to the generated force. The first spring element 16 and the second spring element 18 do not necessarily have to be formed in two pieces, but embodiments may also be considered in which the portions 16, 18 illustrated are formed by a one-piece element having a recess through which the first transmission element 14 extends. The one-piece design is illustrated in FIG. 3D as a third spring element 55.

The second lever device 20 has a second transmission element 22 which may be designed at least essentially structurally identically to the first transmission element 14. This second transmission element 22 has a fourth bearing region 40 which lies on a surface of the second housing portion 28 which forms an abutment for the second transmission element 22. The second transmission element 22 has, furthermore, a fifth bearing region 42 which is provided in the highest region of the convex surface of the second transmission element 22. A sixth bearing region 44 is assigned to an actuating member 46 to be actuated. The guide plate 24 is arranged partially above the bore in which the actuating member 46 is guided. The guide plate 24 serves preferably as a stop for the actuating member 46. In order to ensure the clearance required for a relative movement between the second transmission element 22 and the second housing portion 28, a recess is provided on the underside of the second transmission element 22. Recesses or gradations are likewise provided in the second housing portion 28 in order to allow the respective relative movements. The second transmission element 22 is introduced into the guide plate 24 and is positioned by the guide plate 24 with respect to a plane which is oriented perpendicularly with respect to the direction of movement of the actuating member 46.

Both the first spring element 16 and the second spring element 18 are essentially L-shaped in the prestressed state, a V-shaped portion 50 being provided in each case in the long leg of the L. The V-shaped portion 50 of the second spring element 18 can be supported on the second transmission element 22 (see also FIG. 3A) or on the correspondingly designed guide plate 24 (see also FIG. 3B), while the V-shaped portion of the first spring element 16 is supported on a guide plate 24, lying on the second housing portion 28, for the second transmission element 22. Preferably, however, a spacing is formed between the V-shaped portion 50 and the second transmission element 22, in order to ensure a free moveability of the second transmission element 22. The forces exerted respectively on the guide plate 24 and on the second transmission element 22 by the V-shaped portions of the first spring element 16 and of the second spring element 18 are determined by the spring characteristics of the spring elements 16, 18. This also applies similarly to the one-part version.

The first transmission element 14 has a first (short) lever arm A1 and a second (long) lever arm B1. The second transmission element 22 similarly has a first (short) lever arm A2 and a second (long) lever arm B2. A downwardly directed deflection of the actuator 10 is transmitted to the actuating member 46 by means of the construction illustrated, in that, first, the third bearing region 38 of the first transmission element 14 is deflected according to the ratio of A1 and B1. The third bearing region 38 of the first transmission element 14 in this case acts on the fifth bearing region 42 of the second transmission element 22 and deflects the second transmission element 22. The sixth bearing region 44 of the second transmission element 22 thereby acts on the actuating member 46 and deflects the latter as a function of the amount of deflection of the actuator 10 and of the lengths of the lever arms A1, B1, A2 and B2. The two-stage lever device illustrated allows a high lever action, without a large amount of construction space being taken up. Furthermore, a high rigidity of the transmission elements 14, 22 can be achieved as a result of their relatively short lever arms. If appropriate, of course, even more than two lever stages may be provided, if this is necessary. In the embodiment illustrated, the actuator center axis m and the actuating member center axis M coincide, this being desirable in many instances. The center axes m and M in this case run through the second bearing region 36 and the sixth bearing region 44. A preferred step-up ratio between a deflection of the actuator 10 and a deflection of the actuating member 46 amounts approximately to 1:5. An example of the dimensions of the respective lever arms is A1=A2=2.4 mm and B1=B2=3.6 mm.

When the first housing portion 26 and the second housing portion 28 are being joined together, the first spring element 16 and the second spring element 18 are prestressed or positioned in such a way that they guide or support the first transmission element 14 in the desired way, specifically without or with only slight play, with the result that a defined position or a stroke step-up with a narrow tolerance is ensured.

Figure 2A:
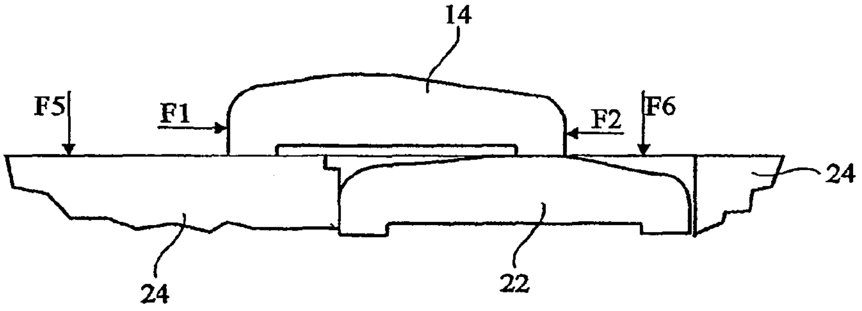
FIG. 2A shows the first transmission element in an equilibrium of forces.
Figure 2B:
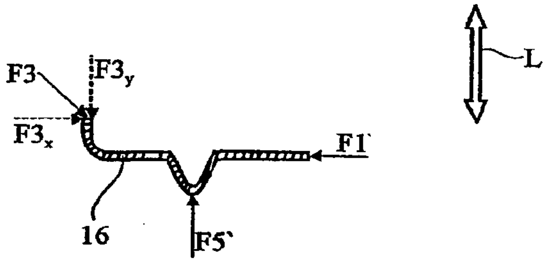
FIG. 2B shows the first spring element in an equilibrium of forces.
Figure 2C:
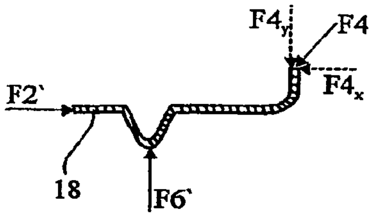
FIG. 2C shows the second spring element in an equilibrium of forces.

FIGS. 2A to 2C illustrate diagrammatically the equilibria of forces for the first transmission element 14, the first spring element 16 and the second spring element 18. Forces corresponding to one another, but oriented in opposite directions are identified in each case by an apostrophe. The first spring element 16 exerts a first force F1 on the first transmission element 14, the first force F1 being oriented approximately perpendicularly with respect to the deflection direction L of the actuator 10. The second spring element 18 exerts on the first transmission element 14 a second force F2 which corresponds in amount to the force F1, but is oriented in the opposite direction. Furthermore, the first spring element 16 exerts with its V-shaped portion 50 a fifth force F5 on the guide plate 24 which is provided for the second transmission element 22. It is preferred, in this case, that the fifth force F5 exerted on the guide plate 24 is determined by the spring characteristic of the first spring element 16. The V-shaped portion 50 of the second spring element 18 similarly exerts a sixth force F6 on the guide plate 24 and/or on the second transmission element 22.

The first spring element 16 is held in an equilibrium of forces by means of a prestressing force F3, the force F3 comprising a force component $F3_y$ which runs approximately parallel to the deflection direction L of the actuator 10, and a force component $F3_x$ which runs approximately perpendicularly with respect to the deflection direction L of the actuator 10.

The second spring element 18 is similarly held in an equilibrium of forces by means of a prestressing force F4. The prestressing force F4 likewise has a force component $F4_y$ running approximately parallel to the deflection direction L of the actuator 10 and a force component $F4_x$ running perpendicularly with respect to the deflection direction L of the actuator 10. The force components $F3_y$ and $F4_y$ in this case correspond in amount to the forces F5' and F6'. Depending on the application, the exertion of the first and of the second force F1, F2 may even be dispensed with and only the guide plate 24 be prestressed by means of the fifth and the sixth force F5, F6 on the second housing portion 28. This prevents the guide plate 24 from being lifted off from the second housing portion.

Figure 3A:
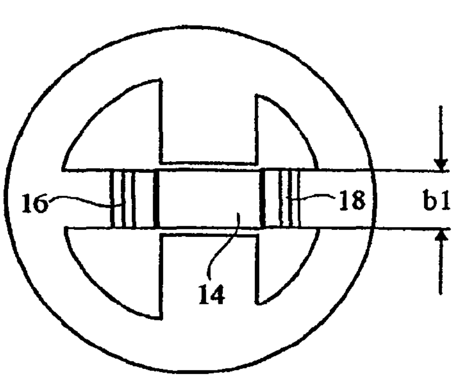
FIG. 3A shows a top view of the spring elements of FIGS. 1 and also 2*b* and 2*c* according to a first embodiment.
Figure 3B:
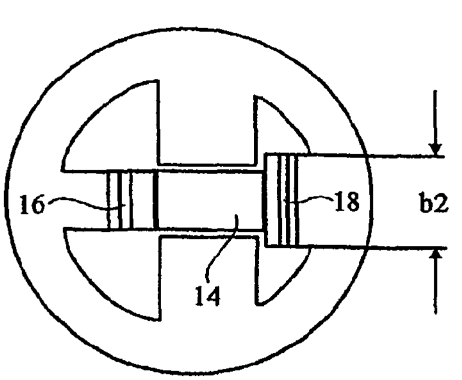
FIG. 3B shows a top view of the spring elements of FIGS. 1 and also 2*b* and 2*c* according to a second embodiment.
Figure 3D:
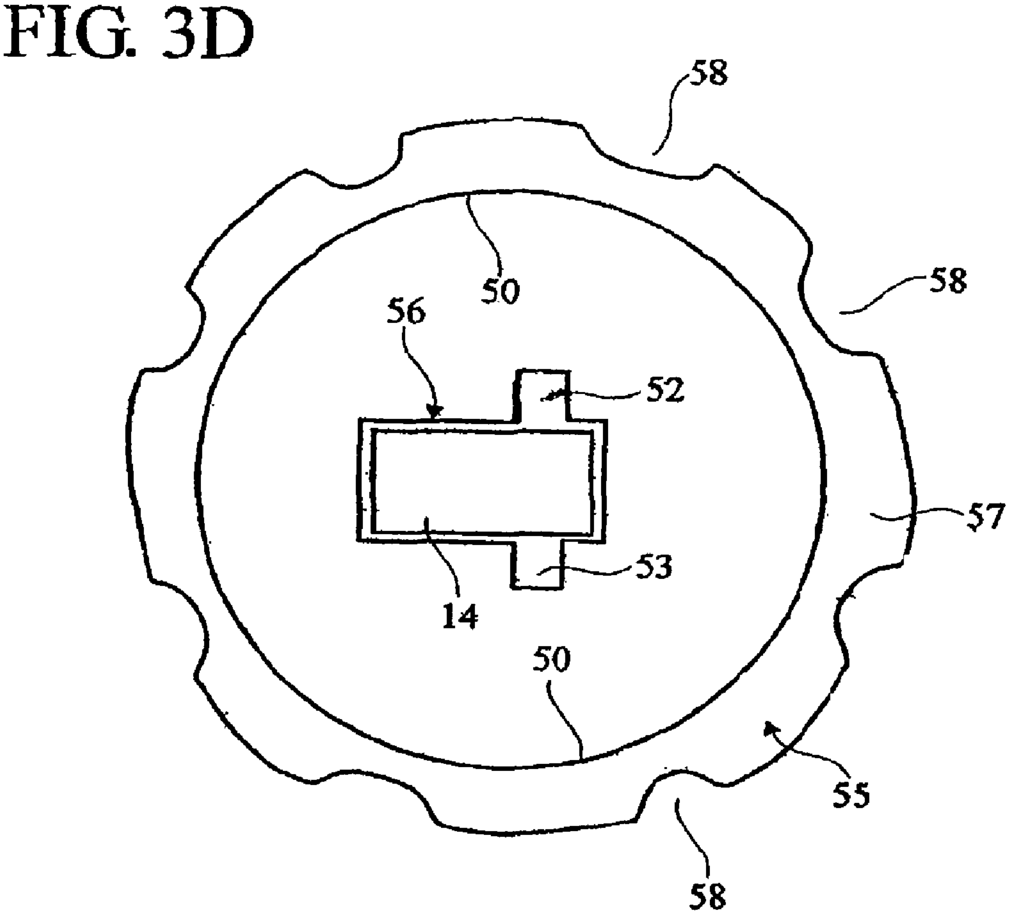
FIG. 3D shows a top view of a one-part spring element according to a third embodiment.

FIG. 3A shows a top view of the spring elements of FIGS. 1 and 2B and 2C according to a first embodiment, and FIG. 3B shows a top view of the spring elements of FIGS. 1 and 2B and 2C according to a second embodiment.

Both in the embodiment according to FIG. 3A and in the embodiment according to FIG. 3B, the first spring element 16 and the second spring element 18 are fastened to an essentially annular carrier or, as is preferred, are formed in one piece with the latter. It may be gathered particularly clearly from the illustrations according to FIGS. 3A and 3B how the first spring element 16 and the second spring element 18 guide or support the first transmission element 14.

In the embodiment according to FIG. 3A, the second spring element 18 has a comparatively small width b1 which makes it possible for the first spring element 16 to be supported on the second transmission element 22 (see FIG. 1).

In the embodiment according to FIG. 3B, the second spring element 18 has, in contrast to this, a comparatively large width b2 which makes it possible for the second spring element 18 to be supported not on the second transmission element 22, but, instead, on a guide plate, for example on the guide plate 24 of FIG. 1.

FIG. 3C shows a diagrammatic top view of the circular guide plate 24 which has a guide recess 51 in which the second transmission element 22 is introduced and oriented in position with respect to the actuating member 46 and to the first transmission element 14 with narrow play. The guide recess 51 is adapted essentially to the outer contour of the second transmission element 22 and the position of the second transmission element 22 is thereby defined with slight play. Preferably, the guide recess 51 has two part recesses 52, 53 projecting laterally beyond the contour of the second transmission element 22. The part recesses 52, 53 are formed symmetrically and opposite one another on two longitudinal sides of the guide recess 51. Via the part recesses 52, 53, the second transmission element 22 can be grasped laterally by means of pliers and lifted out of the guide recess 51, for example for exchange. The bearing region of a third embodiment of a one-part spring element 55, which is illustrated diagrammatically in FIG. 3D, is arranged, as a broken circular line 54, on the guide plate 24.

FIG. 3D shows a third spring element 55, in the form of a circular disk, which constitutes a one-part version of the first and of the second spring element 16, 18 and serves for guiding the first transmission element 14 and for prestressing the guide plate 24. The third spring element 55 has a guide orifice 56 in which the first transmission element 14 is introduced and oriented in position. The transmission element 14 is introduced into the guide orifice 56 with play in all directions. Preferably, the guide orifice 56 has the outer contour of the first transmission element 14, although two part recesses 52, 53 arranged at the side edges of the guide orifice 56 may be formed opposite one another, which make it easier to demount the first transmission element 14. The third spring element 55 has a slightly upwardly inclined circular edge region 57. The edge region 57 serves for bearing against the first housing portion 26. Furthermore, the third spring element 56 has a V-shaped portion 50 which runs circularly around the center of the third spring element 55 and is provided for bearing on the guide plate 24. The third spring element 55 is, for example, stamped out of a spring steel sheet and shaped.

Preferably, the edge region 57 has recesses 58. The recesses 58 are of preferably semicircular design and are arranged uniformly around the outer circumference of the edge region 57. The recesses 58 serve, in the event of a desired spring rigidity of the third spring element 55 which is dependent on the material thickness of the third spring element 55, for exerting on the guide plate 24, via the V-shaped portion 50, a defined prestressing force which is independent of the material thickness. The recesses 58 may also be designed in other shapes.

Figure 3E:
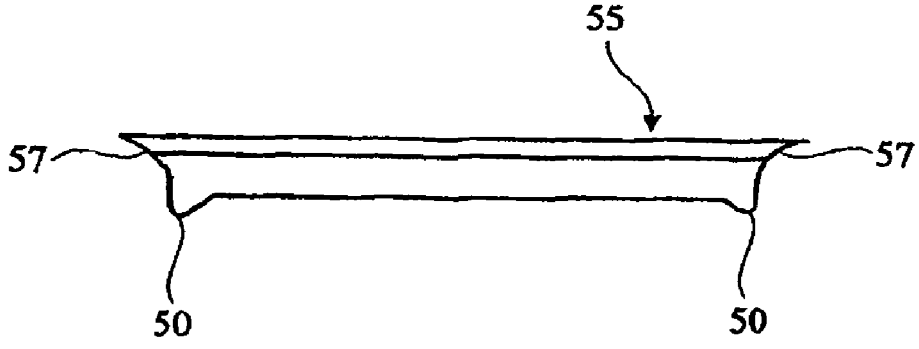
FIG. 3E shows a cross section through the third embodiment of the one-part spring element.

FIG. 3E shows a diagrammatic cross section through the third spring element 55.

The features of the invention which are disclosed in the above description, in the drawings and in the claims may be essential, both individually and in any desired combination, for the implementation of the invention.

What is claimed is:

1. An apparatus for the transmission of a deflection of an actuator of an injection valve, comprising at least one first lever device which comprises a first transmission element which transmits the deflection of the actuator, and a spring element for guiding the first transmission element, wherein the first transmission element is supported on a plate, the spring element is compression-mounted between a first housing portion and the plate, and the spring element prestresses the plate against a second housing portion.

2. An apparatus according to claim 1, wherein the plate constitutes a stop for an actuating member to be actuated by the actuator.

3. An apparatus according to claim 1, wherein the spring element is of essentially circular design and has a guide orifice in which the first transmission element is introduced and positioned.

4. An apparatus according to claim 3, wherein the spring element has a circular edge region which bears against the first housing portion, and wherein the edge region has recesses.

5. An apparatus according to claim 3, wherein the spring element has a downwardly curved edge region which runs around and which lies on the guide plate.

6. An apparatus according to claim 1, wherein the plate is designed as a guide plate in the form of a circular disk, and wherein the guide plate has a recess in which the second transmission element is arranged.

7. An apparatus according to claim 1, wherein a second spring element is provided for guiding or mounting the first transmission element.

8. An apparatus according to claim 1, wherein the spring element and/or the second spring element has a flat spring characteristic curve in relation to the force generated in each case.

9. An apparatus according to claim 1, wherein the actuator is assigned a first housing portion and the first lever device and/or the second lever device are/is assigned a second housing portion, the first housing portion and the second housing portion being sealed off via at least one sealing surface running approximately perpendicularly with respect to the deflection direction of the actuator.

10. An apparatus for the transmission of a deflection of an actuator of an injection valve, comprising a first transmission element supported on a plate and arranged adjacent to the actuator and guided by a spring element compression-mounted between a first housing portion and the plate, wherein the spring element prestresses the plate against a second housing portion.

11. An apparatus according to claim 10, wherein the plate constitutes a stop for an actuating member to be actuated by the actuator.

12. An apparatus according to claim 10, wherein the spring element is of essentially circular design and has a guide orifice in which the first transmission element is introduced and positioned.

13. An apparatus according to claim 12, wherein the spring element has a circular edge region which bears against the first housing portion, and wherein the edge region has recesses.

14. An apparatus according to claim 12, wherein the spring element has a downwardly curved edge region which runs around and which lies on the guide plate.

15. An apparatus according to claim 10, wherein the plate is designed as a guide plate in the form of a circular disk, and wherein the guide plate has a recess in which the second transmission element is arranged.

16. An apparatus according to claim 10, wherein a second spring element is provided for guiding or mounting the first transmission element.

17. An apparatus according to claim 10, wherein the spring element and/or the second spring element has a flat spring characteristic curve in relation to the force generated in each case.

18. An apparatus according to claim 10, wherein the actuator is assigned a first housing portion and the first transmission element and/or the second transmission element are/is assigned a second housing portion, the first housing portion and the second housing portion being sealed off via at least one sealing surface running approximately perpendicularly with respect to the deflection direction of the actuator.

* * * * *